Dec. 31, 1940.  W. F. ZIMMERMANN  2,227,404
GUARD FOR HORIZONTAL SHAFTS
Filed April 15, 1939   2 Sheets-Sheet 1
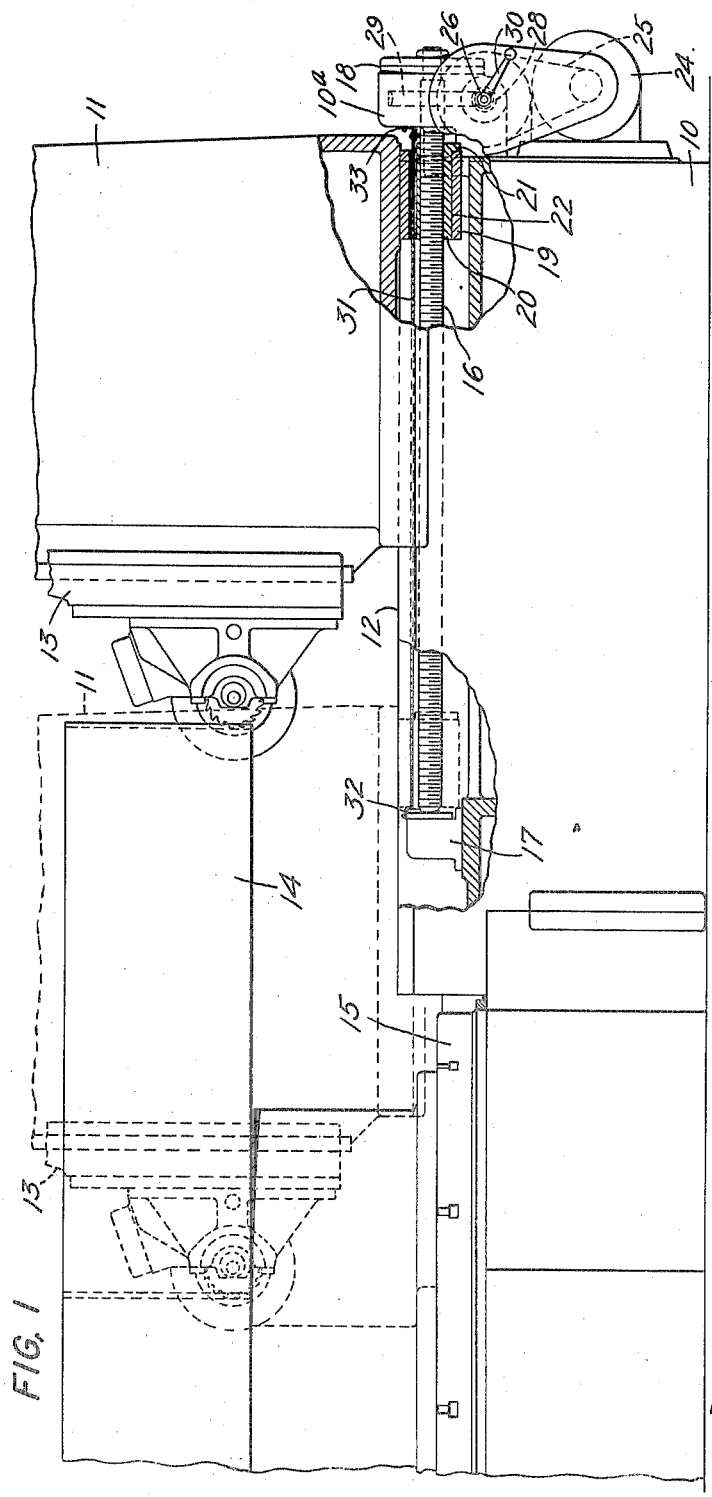
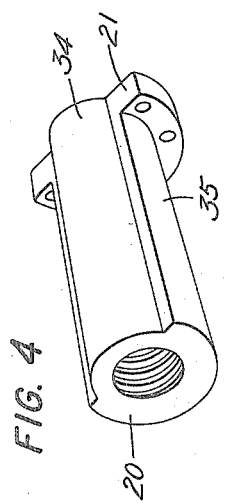
INVENTOR
William F. Zimmermann
BY
Albert F. Nathan
ATTORNEY Dec. 31, 1940.  W. F. ZIMMERMANN  2,227,404
GUARD FOR HORIZONTAL SHAFTS
Filed April 15, 1939  2 Sheets-Sheet 2

INVENTOR
William F. Zimmermann
BY
Albert F. Nathan
ATTORNEY

Patented Dec. 31, 1940

2,227,404

UNITED STATES PATENT OFFICE 2,227,404

GUARD FOR HORIZONTAL SHAFTS

William F. Zimmermann, Maplewood, N. J., assignor to Gould & Eberhardt, Newark, N. J., a corporation of New Jersey Application April 15, 1939, Serial No. 267,973

3 Claims. (Cl. 74—609)

The present invention relates to improvements in machine tools and more particularly to a cover for protecting the threads of a horizontally disposed screw shaft. In machine tools such as gear hobbing machines, horizontal screw shafts are employed for propelling the cutter stanchion toward or away from the workpiece, and great care must be taken to prevent undue wear and consequent play and backlash between the various elements of the transmission. This applies to the feed screws of the machine and more particularly to the horizontal feed screws which heretofore have been exposed to falling chips and other foreign particles which tend to adhere to the threads and cause excessive wear of the threads of the nut.

In general, the length of the nut and the number of threads thereon, is but a small fraction of the length of the screw shaft and its number of threads and, consequently, the threads of the nut, under the very best of conditions, will receive many times the amount of wear as will the threads of the screw. In those environments, as in the instant case, where the major length of the feed screw is normally exposed to falling particles of iron and steel, the clinging of such particles to the threads greatly accentuates the rate of wear on the relatively few threads on the nut.

A primary object of the present invention is to prevent the chips incident to the tooling operation from coming in contact with the screw shaft so that the shaft, throughout its length, will remain free from grit or other bits and particles that have an abrading effect upon the threads of the nut.

A further object of the invention is to protect a screw, upon which a cooperating nut is mounted for relative translation over its entire length, in a manner whereby protection is afforded at both sides of the nut irrespective of the relative position of the nut longitudinally of the shaft.

A further aim of the invention is to render available a rigid one-piece guard which may be disposed in close proximity with the periphery of the shaft and extend the full length thereof in partially encircling relation. In a hobbing machine the invention is particularly applicable to the horizontal stanchion-feed screw shaft that lies between and below the ways of the stanchion and bed members. In such a machine the feed nut is secured in a depending power transmitting element of the machine. The screw shaft, which passes through the nut and extends to opposite sides of the stanchion is submerged in a longitudinal channel and is journaled in the bearings at each end in the base of the machine. By reason of space limitations and other considerations involved, telescoping, movable or sliding guards do not present feasible solutions to the problem of protecting horizontal shafts of this character from injury.

When the shaft is rotated the stanchion-secured-nut is propelled along its thread until the stanchion has reached the desired position. During such translation of the stanchion from one extreme position on the bed to the other, the heretofore exposed portion of the feed shaft is transferred from the front of the stanchion to the rear thereof, or conversely; and in either case the threads thereof are exposed to falling dirt which later would be encountered by the threads of the nut, causing excessive wear thereof.

The present invention undertakes to protect the feed shaft from falling chips and from injury due to falling hand tools, parts of machinery, workpieces, or fixtures, by the provision of a compact rigid self-supporting guard that overlies the shaft and partly encircles the same and which is continuous from one end of the feed shaft to the other.

In the attainment of the objectives of this invention, it is proposed to construct the guard from a strip of flat steel stock and to give the strip a transverse curvature slightly larger than the external diameter of the feed screw, throughout its length thereby to afford a rigid arched member which is self-supporting and non-sagging in nature.

The necessity for the positioning of the guard above the screw shaft, between the shaft and the over traveling stanchion, introduces complications in the translatable feed nut and mounting. The problem is met by the present invention, in the provision of a sleeve type of nut in which a longitudinal channel is cut in its periphery. The angular width of the channel is slightly greater than the angular width of the guard and when the nut is assembled in its bearing, the channel in its periphery provides an unobstructed arcuate slot for receiving the arched one-piece guard therethrough. In this way there is provided a rigid continuous shaft guard which effectively protects the threads against injury from falling chips or tools and a mounting therefor constructed in a manner such that cooperating power driven elements of the mechanism, which completely encircle the shaft, may be traversed therealong throughout its length.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and, in such drawings, like characters of reference denote corresponding parts throughout all the views, of which:

Figure 1 of the drawings is a side elevation partly in section of portions of a hobbing machine embodying the present invention.

Fig. 4 is a perspective view of the nut.

Figure 2:
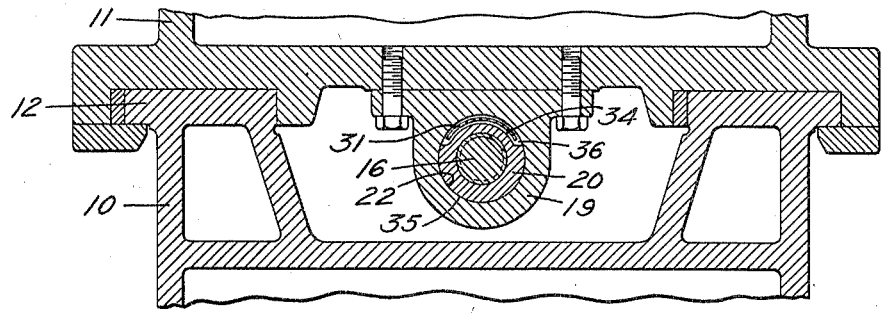
Fig. 2 is a transverse sectional view thereof illustrating more clearly the submerged relation of the feed screw shaft to the ways of the machine and the relation of the guard to the shaft and nut mounting.

Referring more particularly to the drawings, the invention is exemplified in connection with a gear hobbing machine having a base member 10 upon which an upstanding stanchion 11 is mounted for lateral translation on a pair of parallel guideways 12. The stanchion carries the usual cutter slide 13, the cutter of which operates upon a workpiece 14 mounted on the table 15.

To accommodate the machine for the cutting of gears of various sizes within the range, for example, of from three to twelve feet in diameter, the cutter stanchion must be moved considerable distances toward and away from the work table and selectively positioned with a high degree of accuracy at a given point in order properly to locate the teeth of the hob with respect to the periphery of the gear blank.

To effect such movements, a screw and nut mechanism is usually provided which in this case, comprises a relatively long screw shaft 16 journaled in bearings 17 and 18 in the base of the machine and below the plane of the ways 12 thereof. A power transmitting bracket member 19 is secured to the under side of the stanchion 11 and depends therefrom into the channel between the ways of the machine and completely encircles the screw shaft 16. A sleeve nut 20, which has a mounting flange 21, is threaded to the shaft 16, and fits within the bore 22 of the bracket. Bolts 23, which pass through holes in the flange 21, are provided for securing the nut against movement angularly and axially relative to the transmitting bracket 19.

Movement of the stanchion to an approximate position is effected preferably by power, and the final fine adjustments are effected by manual means. The power may be derived from the main transmission of the hobbing machine or, as in the present instance, from a separate motor 24 mounted to the side of the machine base. A chain 25 transmits the motive power to a worm shaft 26 journaled in a supplemental bracket 10a also secured to the side of the machine base. The worm shaft 26 carries a worm 28 which meshes with a worm gear 29 that is journaled in the bracket 10a and keyed or otherwise secured to the screw shaft 16. The worm shaft 26 is provided with a crank receiving socket at its outer end to which a handle 30 may be applied for operating the worm shaft manually.

In a machine of the character disclosed, the screw shaft 16 is many times the length of its cooperating nut and extends to opposite sides of the stanchion various distances depending upon the lateral position of the stanchion relative to the work table. In all cases, however, considerable portions of the horizontal screw shaft are ordinarily exposed to dirt, chips, tools and other foreign matter which may fall from above.

In the case of dirt and chips and the like, such particles have a tendency to adhere to the threads of the shaft, and which, when encountered by the translating nut, promote excessive wear on the threads of both nut and shaft thereby introducing an objectionable degree of end-play and backlash in the gearing. Also, with an exposed screw, the threads thereof are always susceptible of becoming damaged by falling objects and the deformed or mutilated threads interfere with the ease of making precision adjustments as well as increasing the wear on the threads of the nut.

Under the best of operating conditions, a single feed screw will outlast a number of nuts for the reason that the wear on the threads of the shaft is distributed over many times the length of thread than is the wear on the thread of the relatively short nut. The aim of the present invention is to prevent the additional wear on the nut occasioned as above mentioned by protecting the screw shaft from falling matter. This objective is achieved by the provision of a rigid guard member 31 mounted in overlying relation to the feed shaft 16.

To attain maximum movement of the nut along the shaft, it is proposed to construct the guard from flat metal strip stock and to extend the guard over the entire effective length of the shaft. The guard, as illustrated in the drawings, overlies and partially envelopes the shaft and is fastened at its ends to the fixed bearings or supports for the feed shaft.

Figure 5:
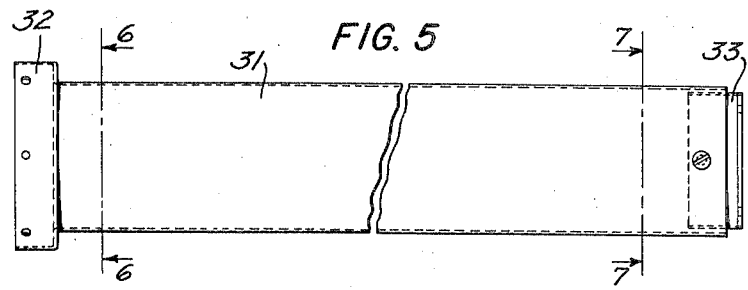
Figs. 5, 6 and 7 are detail views of the guard.
Figure 6:
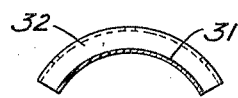
Figure 7:
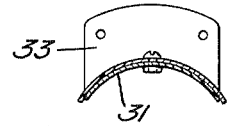

In the instant transmission, a telescoping guard, sliding plates, or guards of the type which unwind as a member is moved, cannot be employed for the reason that in all such types of guards, a substantial portion of the feed shaft at one or both ends thereof cannot be used because of the space required for a collapsible or contracting type of guard. The object of the present invention is to render available a rigid shaft guard that may be applied to a machine tool without subtracting or delimiting the extent of longitudinal movement of the element translated thereon. That is to say, to provide a shaft guard so constructed and arranged that the translatable part may operate over the entire effective length of the shaft protected by the guard. To accomplish that end the invention proposes a construction involving a rigid guard which passes completely through the translatable nut, and which, therefore, may be made continuous from end to end of the protected shaft. Figs. 1 and 5 of the drawings illustrate more clearly a preferred construction of the guard and guard mounting effectively meeting the foregoing requirements.

The guard 31 is made preferably from stock of a width somewhat greater than the diameter of the shaft to be protected. The strip is given a curvature, of a radius slightly larger than the shaft radius, throughout its length, and when placed in overlying relation with the shaft extends part way down along the sides thereof to afford greater protection. In the present instance, the guard has an included angle of approximately 120° and when laterally extended, the arched formation renders the guard self-supporting and inherently resistent to collapsing or sagging.

One end of the strip may be formed with a step 32 by means of which it may be secured to the shaft housing or bearing support, while the main part of the guard lies relatively close and parallel with the feed screw shaft. The opposite end of the guard is left straight for convenient assembly and is supported upon a curved shelf 33. The guard proper passes clear through the nut and its supporting bracket and permits translation of the nut therealong without disturbing the protecting relation of the guard to the shaft.

Figure 3:
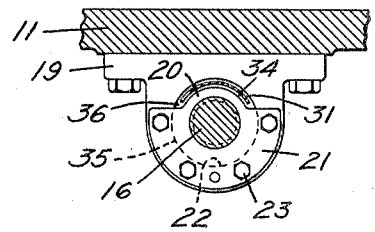
Fig. 3 is a detail view illustrating more clearly the nut mounting looking from the flanged end thereof.

A preferred method of providing for a completely closed passage-way in the nut and bracket is disclosed more clearly in connection with Figs. 2, 3 and 4 of the drawings and consists in milling or otherwise forming a longitudinally extending channel 34 in the outer periphery of the sleeve type nut 20. The channel extends the full length of the nut and its flange and progresses around less than half of the external periphery of the sleeve. The uncut portions 35 of the sleeve extend some distance beyond the diameter (an angular distance of approximately 220°) so that a substantial bearing is provided for the sleeve as a whole. The bore 22 in the supporting bracket 19 remains, in this instance, circular and when the nut is inserted into the bracket, an arcuate passage-way 36 is formed by the nut and bracket.

The straight end of the guard 31 is inserted through the passage-way 36 and when so assembled is completely surrounded by integral portions of the bracket. By so relating the parts, the bracket, which transmits the propelling forces to the stanchion, may be firmly secured to the underside thereof at both sides of the axis of the nut and shaft, thus effecting a balanced transmission of the forces.

From the foregoing it will be perceived that an effective means, simple and compact in character, for protecting a shaft is provided which does not delimit the available movement of a part that is translatable on the shaft. The guard itself comprises but a single rigid element, devoid of complications and therefore adapted to inexpensive manufacture and assembly. Further complications have been avoided by passing the guard completely through the movable element of the transmission and, as herein proposed, the passage way may be provided without sacrificing strength or detracting from the rigidity in the mounting of any of the parts.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. In combination with a machine tool base, a member movable thereon, a non-translatable horizontal screw shaft for effecting movement of said member along said base, said shaft normally being exposed at both sides of the movable member to falling chips or other foreign matter, a sleeve nut secured to the underside of the movable member in cooperating encircling relation with the threads of said screw shaft, a rigid one-piece elongated guard member overlying the said shaft and extending the full distance between the bearings thereof, said sleeve nut having an open sided channel formed in its outer periphery extending axially thereof from end to end, a bracket member completely encircling said channeled nut for receiving and securing said nut non-rotatably to the underside of said movable member with the longitudinal opening formed by the said axially extending channel of the nut and the inner surface of said supporting bracket positioned between the nut proper and the movable member to be propelled thereby and in registry with the said guard for receiving same therethrough.

2. In combination with a machine tool base, a member movable thereon, translating means inculding a horizontal non-translatable screw shaft normally extending to opposite sides of the movable member and exposed to falling chips or other foreign matter, a sleeve nut mounted on the shaft in cooperative encircling relation with the threads thereof, a non-translatable one-piece elongated guard member overlying the screw shaft and extending from end to end thereof, a bracket member having a bore therein to receive said sleeve nut for supporting and securing said nut to the underside of said member, said nut and bracket together being constructed as to provide an axially extending opening therebetween situated between the nut proper and the member to be translated for receiving the said guard therethrough, and means for rotating the screw shaft to effect translation of the nut and its supporting bracket along the shaft and guard members whereby the translatable member may be shifted on the said base while maintaining said guard in guarding relation with the threads of the screw shaft.

3. In combination with a machine tool base, a member translatable thereon, means for translating said member including a screw shaft and a coacting sleeve nut encircling said shaft, said translatable member also having a portion depending therefrom in encircling relation to said screw and nut, a non-translatable guard member overlying the threads of said shaft and extending through the opening in said depending portion of the shiftable member, and means for securing and supporting said nut in the opening in said encircling depending portion wholly to the underside of said guard member and in spaced relation therewith so that the guard member also overlies the nut proper and is positioned between the said nut and translatable member to be shifted thereby.

WILLIAM F. ZIMMERMANN.